Aug. 30, 1960 S. H. SMITH 2,950,586
CRANKPIN GRINDING APPARATUS
Filed Nov. 19, 1958 3 Sheets-Sheet 1
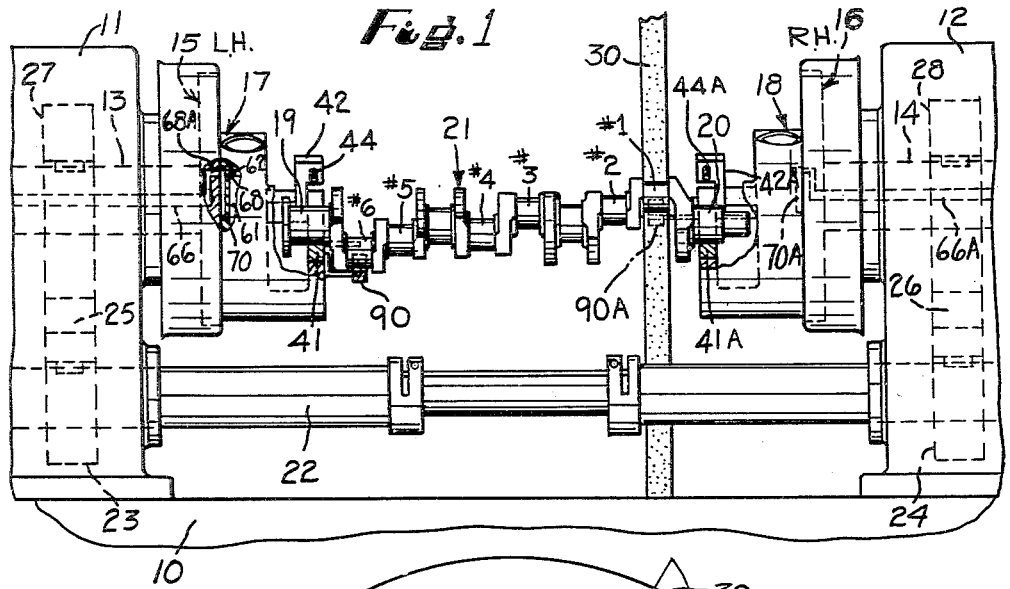
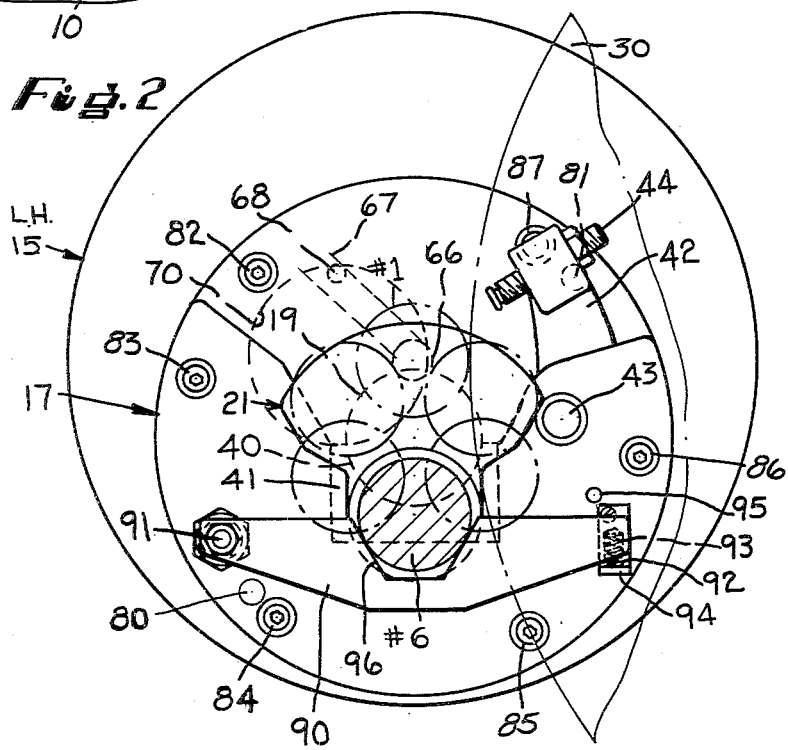
INVENTOR
STEPHEN H. SMITH
BY
Harold W. Eaton
ATTORNEY

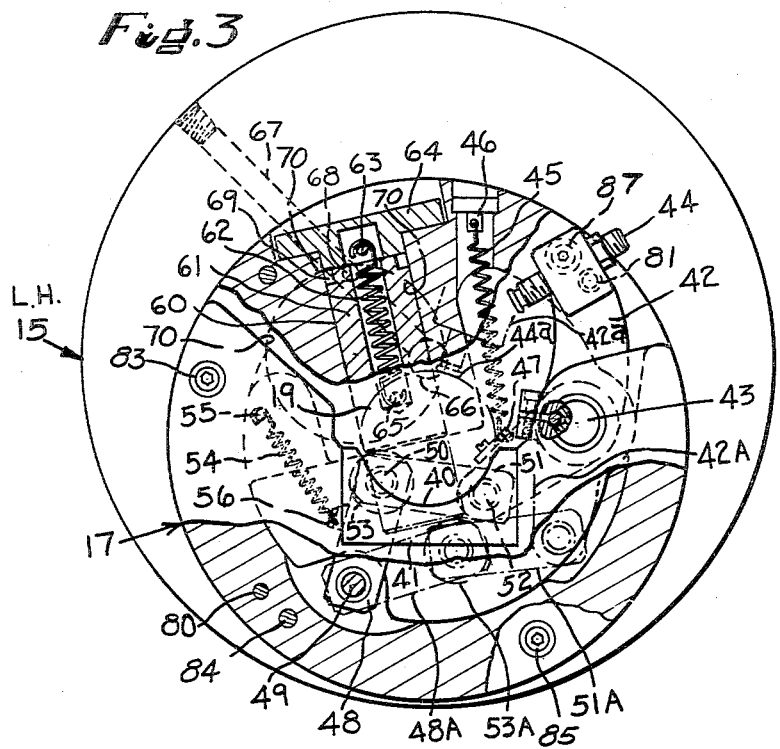

Aug. 30, 1960 S. H. SMITH 2,950,586
CRANKPIN GRINDING APPARATUS
Filed Nov. 19, 1958 3 Sheets-Sheet 3
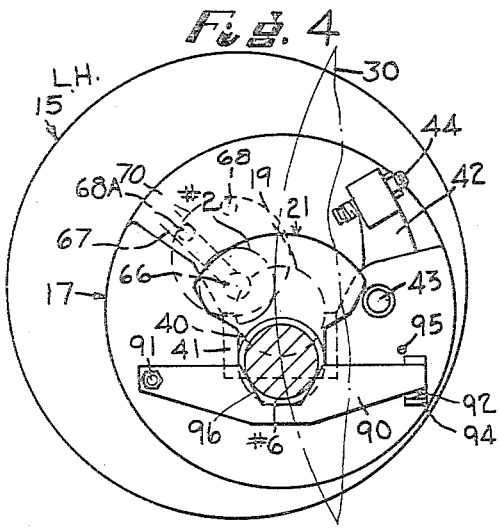
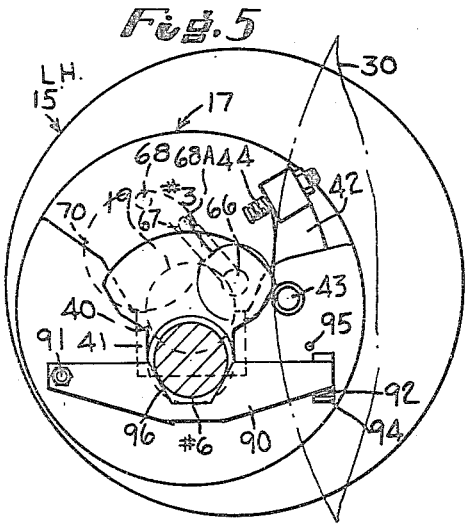
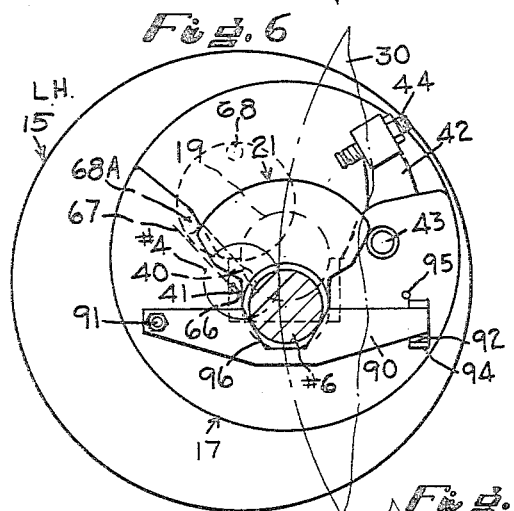
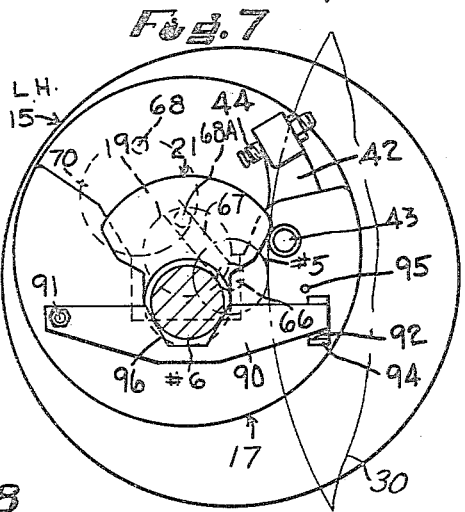
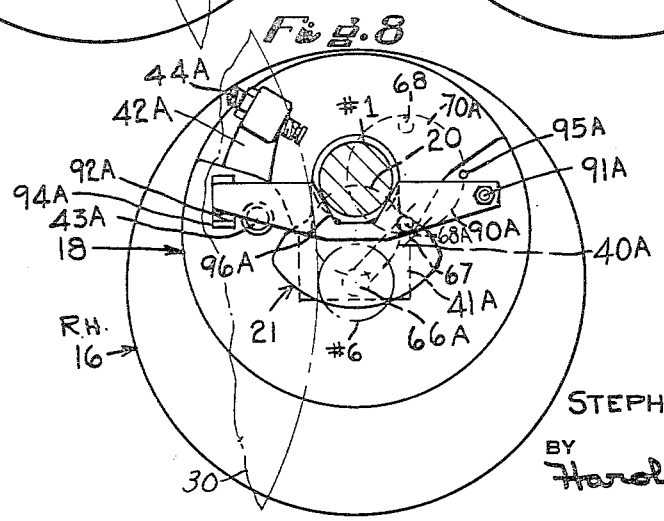
INVENTOR
STEPHEN H. SMITH
BY
Harold W. Eaton
ATTORNEY United States Patent Office 2,950,586
Patented Aug. 30, 1960

2,950,586

CRANKPIN GRINDING APPARATUS

Stephen H. Smith, Webster, Mass., assignor to Norton Company, Worcester, Mass., a corporation of Massachusetts Filed Nov. 19, 1958, Ser. No. 775,007

6 Claims. (Cl. 51—237)

The invention relates to grinding machines and, more particularly, to a crankpin grinding machine.

One object of the invention is to provide a simple and thoroughly practical crankpin grinding machine. Another object is to provide an improved hydraulically operated pot chuck with a self-contained hydraulically actuated clamping jaw. Another object is to provide a hydraulically operated pot chuck which is arranged to be positioned in one of several predetermined positions on a supporting and driving plate for positioning a predetermined crankpin for a grinding operation. Another object is to provide a hydraulically operated pot chuck with a circular fluid channel for supplying fluid under pressure to the clamping cylinder which is arranged to form fluid connections with a port on the supporting face plate when the pot chuck is positioned in any one of a plurality of predetermined positions on the face plate.

A further object is to provide an angular work locator on one of a pair of cooperating pot chucks having a locating surface which is engaged by a portion of the crankshaft as it is loaded into the pot chucks precisely to position the crankshaft with a crankpin to be ground in axial alignment with the axis of the workhead spindles.

Another object is to provide a yieldably mounted angular work locator on one of the pair of cooperating pot chucks having a V-shaped notch which is engaged by a portion of the crankshaft as it is loaded into the pot chuck precisely to align a crankpin to be ground into axial alignment with the axis of the work spindles. Other objects will be in part obvious or in part pointed out hereinafter.

In the accompanying drawings in which is shown one of various possible embodiments of the mechanical features of the invention:

Fig. 1 is a fragmentary front elevation of a crankpin grinding machine embodying the invention;

Fig. 2 is a right hand end elevation, on an enlarged scale, of the left hand pot chuck with the pot chuck and angular locator positioned for grinding #1 pin;

Fig. 3 is a right hand end elevation of the left hand pot chuck, partly broken away and shown in section to clarify the construction;

Fig. 4 is a similar right hand end elevation, on a reduced scale, of the left hand pot chuck with the pot chuck and angular locator positioned for grinding #2 pin;

Fig. 5 is a similar right hand end elevation of the left hand pot chuck with the pot chuck and angular locator positioned for grinding #3 pin;

Fig. 6 is a similar right hand end elevation of the left hand pot chuck with the pot chuck and angular locator positioned for grinding #4 pin;

Fig. 7 is a similar right hand end elevation of the left hand pot chuck with the pot chuck and angular locator positioned for grinding #5 pin; and Fig. 8 is a left hand end elevation of the right hand pot chuck with the pot chuck and angular locator positioned for grinding #6 pin.

A grinding machine has been illustrated in the drawing comprising a base or work table 10 which supports a pair of spaced aligned work heads 11 and 12. The work heads 11 and 12 support a pair of axially aligned rotatable work spindles 13 and 14 respectively. The adjacent inner ends of the spindles 13 and 14 are provided with face plates 15 and 16, respectively, which support a pair of work supporting pot chucks 17 and 18. The pot chucks 17 and 18 are arranged to engage and support spaced main bearings 19 and 20 on the opposite ends of a crankshaft 21 to be ground.

A driving mechanism is provided synchronously to rotate the work spindles 13 and 14. This mechanism comprises a drive shaft 22 which may be arranged substantially the same as that shown in U.S. patent to S. S. Mader No. 2,723,503, dated November 15, 1955 to which reference may be had for details of disclosure not contained herein. The shaft 22 is provided with spaced sprockets 23 and 24 located within work heads 11 and 12, respectively. The sprockets 23 and 24 are connected by link chains 25 and 26, respectively, with sprockets 27 and 28, respectively. The sprockets 27 and 28 are keyed onto spindles 13 and 14, respectively. It will be readily apparent from the foregoing disclosure that rotary motion of the drive shaft 22 will be imparted through the drive mechanism, just described, synchronously to rotate the pot chucks 17 and 18 to drive the crankshaft 21 during a grinding operation.

A transversely movable rotatable grinding wheel 30 is provided for grinding a predetermined portion, such as a crankpin, on the crankshaft 21 to the desired extent in a manner substantially the same as disclosed in the above mentioned U.S. patent.

The pot chucks 17 and 18 are arranged to support the main bearings 19 and 20 of the crankshaft 21 with their axes offset relative to the axis of rotation of the spindles 13 and 14 so that the axis of a crankpin #1 to be ground is aligned with the axis of the spindles. As illustrated in Fig. 3, the pot chuck 17 is provided with a half bearing 40 for supporting the main bearing 19 of the crankshaft 21, said bearing 40 being formed in the upper side of a bearing block 41. Similarly, the pot chuck 18 (Fig. 8) is provided with a half bearing 40A for supporting the main bearing 20 of the crankshaft 21, said half bearing 40A being formed in the upper side of a bearing block 41A.

The pot chuck 17 is provided with a pivotally mounted clamping jaw 42 which is supported by a pivot stud 43. The jaw 42 is provided with a clamping screw 44 which is arranged to swing into engagement with the main bearing 19 to clamp it into engagement with the half bearing 40. A tension spring 45 is connected between a stud 46 on the pot chuck 17 and a plate 47 on the jaw 42 normally to maintain the clamping jaw 42 in an open or inoperative position.

A toggle lever mechanism is provided on the pot chuck 17 for actuating the clamping jaw 42. One end of a toggle lever 48 is pivotally connected by a stud 49 to the pot chuck 17. The other end of the lever 48 is connected by a stud 50 with a toggle lever 51. The other end of the lever 51 is connected by a stud 52 with the clamping jaw 42. The stud 50 supports an actuating roller 53. A tension spring 54 is connected at one end to a stud 55 fixedly mounted on the pot chuck 17, and at the other to a plate 56 fixedly mounted on the arm 48. The spring 54 serves normally to hold the toggle levers 48—51 in the position shown in Fig. 3 with the clamping jaw 42 in an unclamped position.

A hydraulically operated mechanism is provided for actuating the toggle levers 48—51 and the clamping jaw 42. The mechanism comprises a cylinder 60 formed with the pot chuck 17. The cylinder 60 contains a slidably mounted piston 61 which is normally held in an uppermost position (Fig. 3) by means of a tension spring 62. The upper end of the spring 62 is connected to a stud 63 carried by a cylinder head 64. The lower end of the spring 62 is connected by a stud 65 with the piston 61. When fluid under pressure is passed through a port 68 into a cylinder chamber 69, the piston 61 is displaced by the fluid to shift roller 63 downward (Fig. 3) to shift toggle levers 48—51 into positions 48A—51A thereby rocking the clamping jaw 42 in a counterclockwise direction into the broken line position 42a so as to clamp the crankshaft in position for a grinding operation.

Fluid under pressure is passed from a suitable source, through central apertures or passages 66 and 66A formed within the work spindles 13 and 14, respectively, then through a radially extending passage 67 (Fig. 3) formed in each of the face plates 15 and 16. Fluid within the passage 67 passes through port 68A formed in the face of each of the face plates 15 and 16. Fluid passing through the port 68A enters a circular chamber 70 formed in the rear face of each of the pot chucks 17 and 18. The port 68A is positioned on the face plates 15 and 16 so that in any predetermined position of the pot chucks on the face plates 15 and 16, the port 68A is aligned with the circular chamber 70 to convey fluid under pressure through the port 68 in the pot chuck into the cylinder chamber 69 to actuate the clamping jaw 42. The pot chuck 17 is located and fixedly mounted on the face plate 15 by a plurality of pins 80 and 81 and is fastened thereon by a plurality of screws 82, 83, 84, 85, 86, and 87.

This invention is particularly applicable to a multiple station transfer-type grinding machine of the type shown in the U.S. patent to J. W. Narel No. 2,813,381, dated November 19, 1957, in which a single crankpin on the crankshaft being ground is ground at each station.

The pot chucks 17 and 18 are positioned differently on the face plates 15 and 16 respectively at each grinding station. The pot chuck 17, positioned as shown in Figs. 1, 2, and 3, is oriented so that crankshaft 21 is angularly located by crankpin #6 to position the crankshaft 21 for grinding the crankpin #1. At the next grinding units, the pot chucks 17 and 18 are positioned, as shown in Fig. 4, for grinding crankpin #2; as shown in Fig. 5, for grinding crankpin #3; as shown in Fig. 6, for grinding crankpin #4; and as shown in Fig. 7 for grinding crankpin #5. At all of these units, the crankshaft 21 is angularly located by crankpin #6 on the left hand pot chuck 17. As shown in Fig. 8, the crankshaft 21 is angularly located by crankpin #1 on the right hand pot chuck 18 for grinding crankpin #6.

An angular crankshaft locating mechanism is provided on the left hand pot chuck 17 automatically to position the crankpin to be ground as the crankshaft is loaded into the pot chucks 17 and 18. This mechanism comprises an angular work locator arm 90 (Fig. 2) which is pivotally supported at its left hand end by a stud 91 mounted on and projecting from the pot chuck 17. A yieldable connection is provided between the right hand end of the arm 90 and the pot chuck 17, comprising a compression spring 92 which fits loosely within a hole 93 formed in the arm 90. The lower end of the spring 92 is supported by a bracket 94 fixedly mounted on the pot chuck 17. The compression of the spring 92 exerts a force tending to swing the arm 90 in a counterclockwise direction. A stop pin 95 on the pot chuck 17 serves to limit the counterclockwise movement of the arm 90.

The arm 90 is provided with a work engaging and locating surface, such as a V-shaped notch 96, which is precisely positioned so as to be engaged by a crankpin as the crankshaft 21 is positioned in the pot chucks 17 and 18. As the main bearings 19 and 20 move into engagement with the half bearings 40 (Figs. 3 and 2), the crankpin #6 engages the V-shaped notch 96 which serves to impart an angular or rotary positioning movement to the crankshaft 21 so as to position the crankpin #1 into axial alignment with the axis of the work spindles 13 and 14. The clamping jaws 42 are then actuated to clamp the crankshaft 21 in position in the pot chucks 17 and 18 while grinding the crankpin #1.

As shown in Fig. 4, the pot chuck 17 is positioned on the face plate 15 so that when the main bearing 19 of the crankshaft 21 is loaded into the half bearing 40, the crankpin #6 engages the V-shaped notch 96 so as to position crankpin #2 in axial alignment with the work spindles 13 and 14 for a grinding operation.

In Fig. 5, the pot chuck 17 is positioned on the face plate 15 so that when the main bearing 19 of the crankshaft 21 is loaded into the half bearing 40, the crankpin #6 engages the V-shaped notch 96 of the locator arm 90 so as to position crankpin #3 in axial alignment with the workspindles 13 and 14 for a grinding operation.

In Fig. 6 the pot chuck 17 is positioned on the face plate 15 so that when the main bearing 19 of the crankshaft 21 is loaded into the half bearing 40, the crankpin #6 engages the V-shaped notch 96 of the locator arm 90 so as to position crankpin #4 in axial alignment with the work spindles 13 and 14 for a grinding operation.

In Fig. 7, the pot chuck 17 is positioned on the face plate 15 so that when the main bearing 19 of the crankshaft 21 is loaded into the half bearing 40, the crankpin #6 engages the V-shaped notch 96 of the locator arm 90 so as to position the crankpin #5 in axial alignment with the work spindles 13 and 14 for a grinding operation.

Noting that the locator arm 90 engages the crankpin #6 to maintain the crankshaft 21 in the proper angular position for grinding crankpins #1, #2, #3, #4, and #5, locator arm 90 must be removed from the pot chuck 17 for grinding the crankpin #6, to avoid interference with the grinding wheel. In order to properly position crankpin #6 for the grinding operation thereon, a locator arm 90A mounted upon pot chuck 18 is used to position crankshaft 21 by engaging the crankpin #1. Since the locator arm 90A and the parts associated therewith correspond in every respect to the locator arm 90 and the parts associated therewith, this assembly and its relation to the pot chuck 18 are not described in detail herein.

In Fig. 8, the locator arm 90A is mounted on the right hand pot chuck 18. The pot chuck 18 is positioned on the face plate 16 so that when the main bearing 20 of the crankshaft 21 is loaded into the half bearing 40A, the crankpin #1 engages the V-shaped notch 96A on the locator arm 90A so as to position the crankpin #6 in axial alignment with the work spindles 13 and 14 for a grinding operation.

It will be readily apparent from the foregoing that in grinding a crankshaft for a six cylinder engine, six grinding units are arranged, one unit for each crankpin to be ground, with the pot chucks and angular work locators positioned as shown in Figs. 2, 4, 5, 6, 7, and 8. The crankshaft 21 to be ground may be loaded and transferred automatically in a manner substantially the same as that shown in the prior U.S. Patent No. 2,813,381, above referred to. As the crankshaft is loaded into the pot chucks 17 and 18, it is automatically oriented by the angular work locator 90 or 90A precisely to position a predetermined crankpin for a grinding operation.

I claim:

1. In a crankpin grinding machine having a rotatable work spindle, a work supporting pot chuck thereon, a half bearing fixedly mounted on said chuck to support a main bearing of a crankshaft with a crankpin positioned in substantial alignment with the axis of said spindle, a pivotally mounted clamping jaw on said chuck to clamp the crankshaft within said bearing, and a yieldably mounted angular work locator on said pot chuck having a locating surface thereon which is engaged by a portion of a crankshaft as it is loaded into the chuck to impart a precise rotary indexing movement to the crankshaft so as to align the axis of a crankpin to be ground with the axis of said spindle.

2. In a crankpin grinding machine having a pair of spaced axially aligned rotatable work spindles, a work supporting pot chuck on each of the adjacent ends of said spindles, a half bearing fixedly mounted on each of said chucks to support the opposite ends of a crankshaft with a crankpin to be ground in substantial alignment with the axis of said spindles, a pivotally mounted clamping jaw on each of said chucks to clamp the opposite ends of a crankshaft within said bearings, and a yieldably mounted angular work locator on one of said chucks having a crankshaft locating surface which is engaged by a crankpin on the crankshaft to impart a precise rotary indexing movement to a crankshaft as it is loaded into said pot chucks.

3. In a crankpin grinding machine, as claimed in claim 2 in combination with the parts and features therein specified in which the angular work locator consists of an arm yieldably mounted on said pot chuck, and said locating surface comprises a notch in said arm which is engaged by a portion of a crankshaft as it is loaded into the pot chuck precisely to position the crankshaft with the crankpin to be ground in axial alignment with the axis of said spindles.

4. In a crankpin grinding machine, as claimed in claim 2, in combination with the parts and features therein specified in which the angular work locator consists of an arm, pivotal connections between one end of said arm and the pot chuck, and yieldable connections between the other end of the arm and the pot chuck, and said locating surface is disposed intermediate the ends of said arm positioned so as to be engaged by a portion of the crankshaft as it is loaded into the pot chucks precisely to position the crankshaft with a crankpin to be ground in axial alignment with the axis of said spindles.

5. In a crankpin grinding machine, as claimed in claim 2, in combination with the parts and features therein specified in which the angular work locator consists of an arm, a pivot stud connecting one end of said arm with the pot chuck, and yieldable connections including a spring connecting the other end of the arm with the pot chuck, and said locating surface comprises a V-shaped notch in said arm which is engaged by a portion of a crankshaft to be ground as it is loaded into the pot chucks precisely to position the crankshaft with the crankpin to be ground in axial alignment with the axis of said spindles.

6. In a crankpin grinding machine having a rotatable work spindle, a face plate on said spindle, a work supporting pot chuck mounted on said face plate, a half bearing fixedly mounted on said chuck to support a main bearing of a crankshaft with a crankpin positioned in substantial alignment with the axis of said spindle, a pivotally mounted clamping jaw on said chuck to clamp the crankshaft within said bearing, a piston and cylinder within said chuck operatively connected to actuate said jaw, a fluid passage within said spindle, a port in said face plate which is operatively connected with said passage, and a circular-shaped fluid chamber in said chuck which is operatively connected with said cylinder, said port and chamber being arranged so that fluid connections are provided between the spindle passage and the cylinder when the pot chuck is located in any position on the face plate.

References Cited in the file of this patent

UNITED STATES PATENTS 2,723,503    Mader _____ Nov. 15, 1955